H. L. McDUFFEE.
WHEEL TIRE.
APPLICATION FILED DEC. 2, 1908.
943,446.
Patented Dec. 14, 1909.
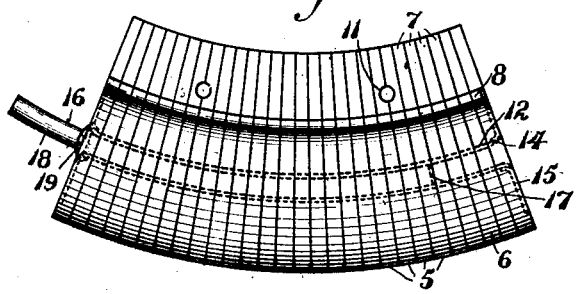
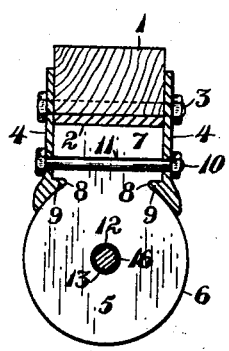
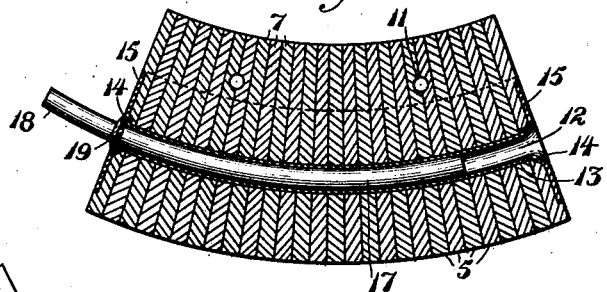
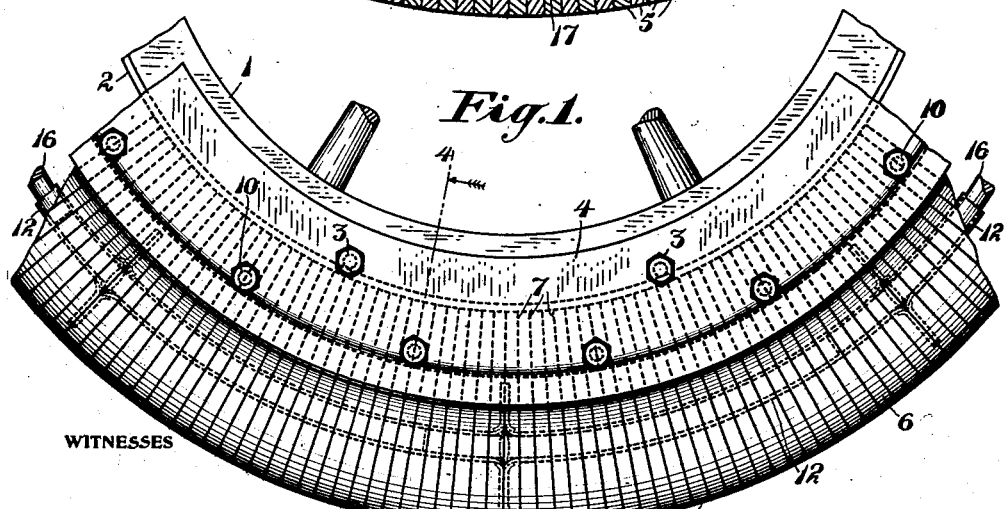
WITNESSES
F. C. Fliedner
Nellie B. Keating.
INVENTOR,
H. L. McDuffee
BY
F. M. Wright,
ATTORNEY

UNITED STATES PATENT OFFICE.

HENRY L. McDUFFEE, OF GILROY, CALIFORNIA.

WHEEL-TIRE.

943,446.  Specification of Letters Patent.  Patented Dec. 14, 1909.

Application filed December 2, 1908. Serial No. 465,687.

*To all whom it may concern:*

Be it known that I, HENRY L. McDUFFEE, a citizen of the United States, residing at Gilroy, in the county of Santa Clara and State of California, have invented new and useful Improvements in Wheel-Tires, of which the following is a specification.

The present invention relates to improvements in the tires of vehicle wheels, and is especially adapted for use in those of self-propelled vehicles. In this invention instead of using an inflated rubber tube, as is now common, the tire is made of solid material, and is therefore intended to be used with a spring-supported hub. The latter construction, however, forms no part of the present invention, which is confined to the special constructions of the tire.

In the accompanying drawing, Figure 1 is a broken side view of a portion of a wheel constructed in accordance with my invention; Fig. 2 is a side view of a section of the tire detached; Fig. 3 is a broken longitudinal sectional view of the same; Fig. 4 is a transverse section on the line 4—4 of Fig. 1; Fig. 5 is a side view of one of the connecting rods detached.

Referring to the drawing, 1 indicates the body of a wheel, a portion only of which is here shown. Said body is made with a cylindrical periphery 2, and, to the margin of the wheel, at each side thereof, are detachably secured, by means of bolts 3, annular side plates 4. Between said side plates are secured tire sections, one of which sections is shown detached in Fig. 2. Each tire section is composed of a suitable number of units 5, all of which are identical in form. Each unit comprises a circular part 6, and a rectangular part 7. The circular parts 6, when the units are put together, form the outer part of the tire, and the rectangular parts 7 lie between the two side plates 4 against the cylindrical periphery 2 of the wheel. In grooves 8 between the circular and rectangular parts, fit ribs or flanges 9 extending inwardly from the side plates, and thus assist in holding the sections in place. The sections are additionally held in place by means of bolts 10 passed through said plates 4, and through transverse holes 11 in the sections.

The units of each section are held together by means of a curved tube 12, which is passed through central holes 13, in the circular parts of the section, the ends of the tubes being as shown at 14, swaged over the edges of metallic circular plates or washers 15. The form of each tube is an arc of a circle having the center of the wheel as a center. Adjacent sections are secured together by means of curved rods 16, each of which has a long portion 17 entering the tube of one of said sections, a shorter portion 18 entering the tube of the other section, and an annular enlargement 19 between the longer and shorter portions. This enlargement fits snugly within the spaces formed by the outward swaging of the ends of the adjacent tubes.

The units of which the sections are composed may be of any suitable material, such as wood, rubber, rawhide, or the like. Evidently, in order to form the curved sections each unit must be slightly thinner at the inner or rectangular portion than at the outer or circular portion. By constructing each section of a plurality of units firmly held together instead of a single piece, its durability is greatly increased. Moreover, the form of the units, and the method of attachment is such that, if made of slightly flexible material, such as rubber or rawhide, the pressure upon any portion of the section tends to squeeze or press the other portions thereof firmly together.

It will be observed that each unit section is held in place in three ways, namely, first, by the inwardly extending flanges of the side plates, second, by the bolts passed through the side plates and the sections, and third, by the curved rods or bars inserted in the tube of the section and also in the tubes of adjacent sections.

An important advantage of the present invention is that the sections can readily be made up of various sizes, and, moreover, if any section becomes damaged, it can readily be removed and replaced by a perfect section.

The tire sections can be assembled by placing them in a circle so that the short end 18 of the rod 16 of one section is just outside the top of an adjacent section, then moving the said rod 16 so that said short end enters the adjacent tube, and then, when all the sections have been placed in this position, closing up the sections so as to make a continuous tire.

I claim:—

1. A vehicle wheel tire consisting of sections, each comprising a plurality of similar units, each having a central aperture, a tube passed through all of said apertures, the ends of the tubes being swaged outward, and a curved rod within the tube of each section, extending also into the tube of an adjacent section, substantially as described.

2. A vehicle wheel tire consisting of sections, each comprising a plurality of similar units, each having a central aperture, and similarly apertured metallic end plates, a tube passed through all of said apertures, the end of the tubes being swaged outward, and a curved rod within the tube of each section and extending also into the tube of an adjacent section, substantially as described.

3. A vehicle wheel tire consisting of sections, each comprising a plurality of similar units, each having a central aperture, and similarly apertured metallic end plates, a tube passed through all of said apertures, the end of the tubes being swaged outward, and a curved rod within the tube of each section and extending also into the tube of an adjacent section, and having an annular enlargement nearer one end than the other, substantially as described.

In testimony whereof I have hereunto set my hand in the presence of two subscribing witnesses.

HENRY L. McDUFFEE.

Witnesses:
FRANCIS M. WRIGHT,
D. B. RICHARDS.